United States Patent
Yeu et al.

(10) Patent No.: US 8,993,106 B2
(45) Date of Patent: Mar. 31, 2015

(54) COATED PAPER HAVING A COATING STRUCTURE WITH CONTROLLED DISTRIBUTION OF LATEX AND METHOD FOR PREPARING THE SAME

(75) Inventors: Seung-Uk Yeu, Daejeon (KR); Chang-Sun Han, Daejeon (KR); Young-Min Lee, Gwacheon-si (KR); Byoung-Yun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/978,484

(22) PCT Filed: May 25, 2011

(86) PCT No.: PCT/KR2011/003845
§ 371 (c)(1),
(2), (4) Date: Jul. 5, 2013

(87) PCT Pub. No.: WO2012/093756
PCT Pub. Date: Jul. 12, 2012

(65) Prior Publication Data
US 2013/0288030 A1 Oct. 31, 2013

(30) Foreign Application Priority Data

Jan. 7, 2011 (KR) .................. 10-2011-0001621
May 24, 2011 (KR) .................. 10-2011-0048942

(51) Int. Cl.
*B32B 7/02* (2006.01)
*B32B 5/16* (2006.01)
(Continued)

(52) U.S. Cl.
CPC ............. *D21H 19/82* (2013.01); *D21H 19/20* (2013.01); *D21H 21/50* (2013.01)

USPC ............ 428/212; 428/213; 428/323; 428/327; 427/361; 427/411

(58) Field of Classification Search
CPC ........ D21H 19/00; D21H 19/36; D21H 19/40; D21H 19/44; D21H 19/48; D21H 19/58; D21H 19/80; D21H 19/82; D21H 19/822
USPC ........... 428/212, 213, 323, 327; 427/361, 411
See application file for complete search history.

(56) References Cited

U.S. PATENT DOCUMENTS

2006/0060317 A1  3/2006 Roding et al.
2008/0097019 A1  4/2008 Lee et al.

FOREIGN PATENT DOCUMENTS

CN    101048550 A    10/2007
CN    101168938 A    4/2008
(Continued)

OTHER PUBLICATIONS

Machine Translation of JP 3926500 via AIPN website.*
(Continued)

*Primary Examiner* — Mark Ruthkosky
*Assistant Examiner* — Laura C Powers
(74) *Attorney, Agent, or Firm* — McKenna Long & Aldridge, LLP

(57) ABSTRACT

Disclosed is coated paper having a coating structure in which styrene-butadiene latex distribution of a paper coating layer is controlled in order to reduce fold cracking of the coated paper and a method for manufacturing the same. The coated paper in which different types of latexes are separately applied to two coating layers exhibits considerably improved stiffness and reduced fold crack, as compared to the existing coated paper.

8 Claims, 1 Drawing Sheet

Fold crack image

Fold crack SEM image (x90)

Adhesion force image

(51) Int. Cl.
*B05D 3/12* (2006.01)
*B05D 1/36* (2006.01)
*D21H 19/82* (2006.01)
*D21H 19/20* (2006.01)
*D21H 21/50* (2006.01)

(56) References Cited

FOREIGN PATENT DOCUMENTS

| | | | |
|---|---|---|---|
| JP | 08-302593 A | 11/1996 | |
| JP | 3926500 B2 | 6/2007 | |
| JP | 4511244 B2 | 5/2010 | |
| KR | 10-2001-0004466 A | 1/2001 | |
| KR | 10-2009-0102894 A | 10/2009 | |

OTHER PUBLICATIONS

Machine Translation of KR 2001-0004466 via KPION website.*

* cited by examiner

Fold crack image Fold crack SEM image (x90) Adhesion force image

Fold crack image Fold crack SEM image (x90) Adhesion force image

COATED PAPER HAVING A COATING STRUCTURE WITH CONTROLLED DISTRIBUTION OF LATEX AND METHOD FOR PREPARING THE SAME

This Application is a 35 U.S.C. §371 National Stage Entry of International Application No. PCT/KR2011/003845, filed May 25, 2011, which claims priority to Korean Patent application No. 10-2011-0001621, filed Jan. 7, 2011 and Korean Patent application No. 10-2011-0048942. filed May 24, 2011, all of which are incorporated by reference in their entirety herein.

TECHNICAL FIELD

The present invention relates to coated paper having a coating structure with a controlled distribution of latex to reduce fold crack of the coated paper and a method for preparing the same. More particularly, the present invention relates to coated paper, fold crack of which is considerably reduced by each distribution two type styrene-butadiene copolymer latexes having different glass transition temperatures and different particle sizes in a particular area of a paper coating layer.

BACKGROUND ART

In general, styrene-butadiene latex is widely used as a binder for bonding an inorganic pigment such as clay, calcium carbonate, aluminum hydroxide ($Al(OH)_3$), and titanium oxide ($TiO_2$) on a piece of paper. The paper thus obtained is referred to as coated paper and various coating properties and physical properties of coated paper will change depending on the type of pigments or binders.

It is fold crack and paper stiffness as highlight important physical properties of the coated paper. In general, when there is a need to retract the paper used for wrapping etc, paper is subjected to printing, ruling and folding process. At this time, the popping a phenomenon in which paper is torn due to the high mechanical pressure is referred to as fold crack. When fold crack occurs, appearance of printed materials is seriously damaged and product values are thus considerably deteriorated. When the deterioration is serious, mechanical strength of wrapping materials is also greatly deteriorated and problems associated with functions of wrapping materials are serious. The paper stiffness is also important to effectively protect the package contents and the paper stiffness generally tend to weaken, as fold crack decreases.

The factors that have the most greatest impact on the fold crack include base paper, coating, pigment, latex, humidity and the like. One of the factors that have the greatest impact depends on type of pulp used as the base paper. Fold endurance and fold crack are affected, especially as thickness increases, fold endurance and paper stiffness is increased, but fold crack is significantly worse.

One of the main factors is the presence of a coating layer. Since a coating layer has very high elasticity compared to a base paper layer, presence of the coating layer occur more easily crack and fold cracks because it improved the paper stiffness, but it weakens the strength to withstand the increased surface area of the folded surface that occurs when you bend a paper. Accordingly, even if the paper of the same thickness, the paper having a thicker coating layer is more likely to be vulnerable to much more serious fold crack.

Pigments used in the coating affect fold crack by changing the elasticity of the coating layer. Typically, it is believed that clay compared to calcium carbonate can increase the resistance to rupture fold cracks.

Humidity is also a major factor and when the humidity is lower, flexibility of the paper is deteriorated and fold cracks becomes more severe.

However, despite all of the above factors are important, for example, in case of the coating paper, the based paper or the humidity is easily replace or be difficult to change or control, and thus the most realistic alternative is the characteristics of the coating layer to improve the fold crack.

The most important factors which affect fold crack including elasticity and flexibility and the like of the coating layer is a latex binder. It is a significant relationship between a kind of latex distributed in a coating layer in some way and the fold crack of the coated paper.

In general, it is believed that, as a glass transition temperature of latex used for the coating layer decreases, flexibility of the coating layer is improved and fold crack is thus reduced. In this case, it may be difficult to accomplish the purpose of the protection of package contents, due to severe degradation of paper stiffness.

In addition, when the latex glass transition temperature increase, paper stiffness is increased, but fold crack will be exacerbated. The particle size of the latex may also affect fold crack. As the smaller the particle size of the latex, a large surface area in which the latex is adhered to the pigment increases and thus adhesion force is increased, while the latex tends to be easily swept into the movement of water, and thus the movement and distribution thereof spreads.

In particular, in a case of the latex used for a coating layer adjacent to a base paper layer, as the smaller of the particle size of the latex, the permeation of latex degree into the base paper layer becomes severe, and thus fold crack will affect by changing the characteristics of the base paper layer adjacent to the coating layer.

Taking into consideration these above factors, it is preferable to use paper comprising a thin base paper, a thin coating layer and the latex with a low glass transition temperature to inhibit the fold crack. However, in order to protect the package contents, it is preferable to choose the base paper as thick as possible and thickening of the coating layer gradually increasing the aesthetic sense of paper users is the current trend. Because it may bring a large decrease in the stiffness of the paper, a plan to use the latex having a low glass transition temperature, is not corresponded to one of possible solutions.

Accordingly, there is a need for methods while maintaining paper stiffness as much as possible and reducing fold crack in order to solve these problems.

DISCLOSURE

Technical Problem

Through extensive research to solve these problems, the present inventors discovered that coated paper with considerably reduced fold cracks can be obtained by each distribution styrene-butadiene copolymer latex having different glass transition temperatures and different particle sizes in a particular area of a paper coating layer and completed the present invention.

That is, it is one object of the present to provide coated paper having a specific structure to significantly reduce fold crack of the coated paper, and a method for preparing the same.

Technical Solution

Through extensive research to solve these problems, the present inventors discovered that coated paper with considerably reduced fold crack can be obtained by each distribution styrene-butadiene copolymer latex having different glass transition temperatures and different particle sizes in a particular area of a paper coating layer and completed the present invention.

That is, it is one object of the present to provide coated paper having a specific structure to considerably reduce fold crack of the coated paper, and a method for preparing the same.

In accordance with an aspect of the present, the above and other objects can be accomplished by the provision of coated paper having a double-layer coating structure in which a pre-coating layer and a top coating layer comprising styrene-butadiene latexes having different particle sizes and different glass transition temperatures are sequentially formed on base paper.

In accordance with another aspect of the present invention, there is provided a method for preparing coated paper, comprising preparing a first coating solution comprising a latex having a particle size of 70 to 120 nm and a glass transition temperature of 10 to 30° C., and a second coating solution comprising a latex having a particle size of 120 to 200 nm and a glass transition temperature of −30 to 0° C.; coating base paper with the first coating solution, followed by drying to form a first coating layer as a pre-coating layer; and coating the first coating layer with the second coating solution, followed by drying to complete the second coating layer as a top coating layer, wherein a total thickness of the coating layer of the first coating layer and the second coating layer is within a range of 20 to 60 μm.

Hereinafter, the present invention will be described in detail.

The present invention has a technical feature in providing coated paper having a double-layer coating structure in which a pre-coating layer and a top coating layer comprising styrene-butadiene latexes having different particle sizes and different glass transition temperatures are sequentially formed on base paper.

The styrene-butadiene latex is basically obtained by emulsion-polymerizing a styrene monomer, a conjugated diene monomer and an ethylenically unsaturated acid monomer.

Examples of the styrene monomer are not limited to preferably select from styrene, α-methyl styrene, α-ethyl styrene, p-methyl styrene, p-ethyl styrene, 2,4-dimethyl styrene, α-methyl-p-methyl styrene, halogenated styrene compounds, o-methoxy styrene and mixtures thereof. In particular, styrene is preferred.

The styrene monomer may be injected within the range of 29 to 79 parts by weight, preferably 39 to 74 parts by weight, with respect to total 100 parts by weight of the total monomers. This is why the content of styrene of less, stiffness and water resistance is lowered, and the content thereof of more, adhesion force and film-forming capability are deteriorated.

Also, the conjugated diene monomer is not limited to be preferably selected from 1,3-butadiene, 2,3-dimethyl-1,3-butadiene, 2-ethyl-1,3-butadiene, 1,3-pentadiene, isoprene and mixtures therefor. In particular, 1,3-butadiene is more preferable.

The conjugated diene monomer is preferably within the range of 20 to 70 parts by weight, preferably 25 to 60 parts by weight, based on the total weight of the monomers. This is why when the content of the conjugated diene monomer is excessively low, adhesion force is deteriorated, and when the content thereof is excessively high, paper gloss and stiffness are degraded.

In order to give a strong adhesion force to the latex, this has a form with being copolymerized with an ethylenically unsaturated acid monomer. The ethylenically unsaturated acid monomer is ethylenically unsaturated monomers containing an acidic group such as a carboxyl group, a sulfonic acid, or an acid anhydride group etc, for example, is preferably selected from ethylenically unsaturated carboxylic acid monomers of acrylic acid, methacrylic acid, itaconic acid, maleic acid, fumaric acid and the like; polycarboxylic acid anhydrides such as maleic anhydride and citraconic anhydride and the like; ethylenically unsaturated sulfonic acid monomers such as styrene sulfonic acid; ethylenically unsaturated polycarboxylic acid partial ester monomers such as monobutyl fumarate, monobutyl maleate, mono-2-hydroxypropyl maleate and the like; and mixtures thereof. Of these, it is preferable to use the ethylenically unsaturated carboxylic acid monomer, most desirable to use methacrylic acid. The ethylenically unsaturated acid monomer may be used in the form of alkali metal salts or ammonium salts.

The ethylenically unsaturated acid monomer is preferably within the range of 1 to 10 parts by weight, preferably 2 to 8 parts by weight, based on the total weight of the monomers. When the addition amount is excessively low, adhesion force and latex stability are deteriorated, and when the addition amount is excessively high, viscosity of latex excessively increases and coating workability is disadvantageously deteriorated.

Furthermore, in order to further improve the printing properties such as adhesion force and printing gloss and the like, it may be use other copolymerizable vinyl monomer such as an ethylenically unsaturated nitrile monomer or an unsaturated carboxylic acid alkyl ester.

The ethylenically unsaturated nitrile monomer is preferably selected from acrylonitrile, methacrylonitrile, fumaronitrile, α-chloronitrile, α-cyanoethyl acrylonitrile and mixtures thereof. In particular, use of acrylonitrile or methacrylonitrile is preferred.

An amount of the ethylenically unsaturated nitrile monomer is preferably 20 parts or less by weight, preferably 3 to 10 parts by weight, based on the total weight of the monomers, and when the content of the ethylenically unsaturated nitrile monomer is excessively low, the ink drying speed may be deteriorated.

Also, the ethylenically unsaturated monomer which may be copolymerized with the ethylenically unsaturated nitrile monomer and the ethylenically unsaturated acid monomer in order to control printing properties is preferably selected from fluoroalkylvinyl ether such as fluoroethylvinyl ether etc; ethylenically unsaturated amide monomers such as (meth) acrylamide, N-methylol (meth)acrylamide, N,N-dimethylol (meth) acrylamide, N-methoxy methyl(meth)acrylamide, and N-propoxy methyl(meth)acrylamide etc; vinyl pyridine; vinyl norbornene; non-conjugated diene monomers such as dicyclopentadiene and 1,4-hexadiene etc; ethylenically unsaturated carboxylic acid ester monomers such as methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxy ethyl (meth) acrylate, cyanoethyl (meth)acrylate, 2-cyanoethyl (meth) acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate, dimethylaminoethyl (meth)acrylate; and mixtures thereof.

The ethylenically unsaturated monomer is preferably up to 8 parts by weight, based on the total weight of the monomers.

When the amount of the ethylenically unsaturated monomer is excessively high, latex stability is readily deteriorated.

The latex may be prepared by emulsion-polymerizing a mixture of the above mentioned respective monomers by any conventional method.

An addition of the monomer mixture is not particularly limited and is desirable to put the monomer mixture in polymerization reactor in batch input, continuous input or put some of the monomer and then continuous input of the rest.

The polymerization temperature is not limited to do within the range of 30 to 100° C., preferably 50 to 85° C.

The emulsion polymerization may include an emulsifier, a polymerization initiator, or a molecular weight control agent and the like.

Above emulsifier is not limited to include, anionic surfactants, nonionic surfactants, cationic surfactants and amphoteric surfactants etc. Of these, anionic surfactants such as alkylbenzene sulfonates, aliphatic sulfonates, sulfuric acid ester salts of higher alcohols, α-olefin sulfonates, and alkyl ether sulfuric acid ester salts may be preferably used.

An amount of the emulsifier is preferably within the range of 0.3 to 10 parts by weight, and more preferably 1 to 6 parts by weight, with respect to 100 parts by weight of the total monomers.

The polymerization initiators are not limited to include preferably inorganic peroxides such as sodium persulfate, potassium persulfate, ammonium persulfate, potassium perphosphate and hydrogen peroxide etc; organic peroxides such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, and t-butyl peroxy isobutyrate; and nitrogen compounds such as azobisisobutyronitrile, azobis-2,4-dimethylvaleronitrile, azobis cyclohexane carbonitrile, and azobis methyl isobutyrate etc; as radical initiators.

It is preferably inorganic or organic peroxide of the radical initiators and persulfate may be used particularly preferably.

the amount of the polymerization initiator is preferably within the range of 0.01 to 2 parts by weight, and more preferably 0.05 to 1.5 parts by weight, with respect to 100 parts by weight of the total monomers.

The molecular weight control agent is not limited to include for example, mercaptans such as α-methylstyrene dimer, t-dodecyl mercaptan, n-dodecyl mercaptan and octyl mercaptan etc; halogenated hydrocarbons such as carbon tetrachloride, methylene chloride, and methylene bromide etc; and sulfur-containing compounds such as tetraethyl thiuram disulfide, dipentamethylene thiuram disulfide, and diisopropyl xanthogen disulfide etc. Of these, it may be used preferably mercaptans and more preferably t-dodecyl mercaptan.

The molecular weight control agent may be changed depending on the type thereof and is preferably within the range of 0.1 to 1.5 parts by weight, and more preferably 0.2 to 0.9 part by weight, with respect to 100 parts by weight of the total monomers.

The glass transition temperature of the latex may be controlled by adjusting a ratio of monomers used in the polymerization. Generally, as styrene content increases, glass transition temperature will be increased, meanwhile, as the content of conjugated diene monomer such as butadiene increases, the lower glass transition temperature will be decreased.

Also, the latex particle size is typically within the range of 70 to 200 nm and may be controlled by adjusting the type and the amount of emulsifier used in emulsion polymerization. Generally, when the emulsifier content used in emulsion polymerization is greater, the particle size of the latex is smaller and when the emulsifier is lower, the latex particle size is increased.

Based on these points, the latex having appropriate the glass transition temperature and particle size may be prepared and these two latex properties and coating structures are primary factors affecting on fold crack and paper stiffness.

One of the above two latexes is not limited to be desirable to use a styrene-butadiene latex which has a glass transition temperature measured by a differential scanning calorimeter (DSC) within the range of 10 to 30° C., preferably 15 to 25° C. and having a particle size measured by a laser scattering method within the range of 70 to 120 nm, preferably 80 to 100 nm. Hereinafter, this latex is simply referred to as "first latex".

When the glass transition temperature is less than 10° C., paper stiffness of the structure in the coating of the present invention will deteriorate, and when the glass transition temperature exceeds 30° C., fold crack and adhesion force degradation will be severe. When the particle size is less than 70 nm, deterioration in fold crack and adhesion force becomes serious due to excessive permeation of latex into the base paper and when the particle size exceeds 120 nm, paper stiffness is lower.

The rest of one kind of latex is not limited to use preferably a styrene-butadiene latex which has a glass transition temperature within the range of −30 to 0° C., preferably −20 to −10° C. and a particle size within the range of 120 to 200 nm, preferably 130 to 180 nm. Hereinafter, this latex is simply referred to as "second latex".

When the glass transition temperature is less than −30° C., paper gloss and paper stiffness of the structure in the coating of the present invention will deteriorated, and when the glass transition temperature exceeds 0° C., fold crack and adhesion force degradation will be severe. In addition, when the particle size is below 120 nm, paper stiffness and paper gloss are greatly deteriorated and when the particle size exceeds 200 nm, deterioration in fold crack and adhesion force become serious.

A coating solution (coating color) may be prepared by mixing the latex thus prepared with a pigment such as clay, and calcium carbonate etc, further an auxiliary pigment such as a plastic pigment and titanium oxide; a filler such as silica; a thickener such as starch and sodium carboxymethyl cellulose (CMC); a chelating agent; a dispersant; a pH adjusting agent; a deoxidizer; a particle size control agent; an antioxidants; and an oxygen scavenger etc, to the resulting mixture, if need.

The coating structure using the two latexes may be divided into onefold coating and twofold coating depending on the number of coating layers. In the present invention, a twofold coating structure using two types of latexes is preferred. Among the coating layers, the coating layer adjacent to the base paper layer is referred to as a first coating layer, and the coating layer formed on the first coating layer and exposed to the surface is referred to as a second coating layer.

That is, the coating structure of the present invention is obtained by distributing latexes having the above mentioned specific glass transition temperature and the above mentioned specific particle size on the first coating layer (pre-coating layer) and the second coating layer (top coating layer), respectively. Specifically, the present invention provides a coating structure in which the first latex is used as a binder for the first coating layer and the second latex is used as a binder for the second coating layer.

The ratio of the thickness of each coating layers, is within the range of 0.1 to 1.0, preferably 0.3 to 0.8 as the ratio of the first/second coating layers. When the thickness ratio is less than 0.1, paper stiffness is deteriorated, and when the thickness ratio exceeds 1.0, fold crack and adhesion force degradation become severe.

The present invention is not limited to, be preferably within the range of about 20 to about 60 μm as total thickness of the first and second coating layer, and when the thickness of the coating layer is too thin, printing physical properties are deteriorated and when the thickness of the coating layer is too thick, fold crack becomes severe.

The latex content of each coating layers may be defined as the weight percent of the solid content. For example, the latex content of the first coating layer (pre-coating layer) is within the range of 3 to 15% by weight, preferably 5 to 12% by weight, based on the solid content of the first coating layer. When the latex content of the first coating layer is less than 3% by weight, fold crack and adhesion force degradation becomes severe and when the content exceeds 15% by weight, paper stiffness is lower.

Also, the latex content of the second coating layer (top coating layer) is within the range of 7 to 20% by weight, preferably 10 to 17% by weight, based on the solid content of the second coating layer and when the content is less than 7% by weight, fold crack and adhesion force degradation becomes severe, and when the content exceeds 20% by weight, paper stiffness is lower.

The coated paper of the present invention may be prepared in the following method. First, the above mentioned two types of styrene-butadiene latex are prepared, and a pigment, an auxiliary pigment, and a thickener or the like is added thereto to prepare a coating solution. Formulation amounts of latex and the thickener are not limited to, mix generally within the range of 5 to 20 parts by weight and 0.1 to 9 parts by weight, with respect to 100 parts by weight of the pigment and the auxiliary pigment. When the latex content is excessively low, adhesion force is decreased and when the content is excessively high, paper gloss and ink drying speed (ink set-off) may be reduced. The thickener is appropriately added in an amount controlled considering the coating speed, the coating thickness and solid of coating solution, optimum coating stability can be obtained.

In particular, the obtained coating solution is desirable to have a solid content of 60 to 75% and pH of 8 to 11 considering the stability of the coating solution together with the stability of the coating.

The first latex-containing coating solution thus obtained is coated on base paper and then dried (pre-coating layer), and the second latex-containing coating solution is coated on the coating layer and then dried (top coating layer) to obtain total double-layer coating layer structure. At this time, a total thickness of the coating layers is within a range of 20 to 60 μm and types of base paper are not limited to include base paper for art paper, base paper for art board paper, and base paper for cardboard etc. In particular, the base paper preferably has a basis weight of 70 to 350 g/m².

The coated paper having a coating structure of the present invention may be applied to super calendar or soft-nip calendar etc on the calendar method.

Advantageous Effects

The present invention provides an improved coated paper with fold crack and paper stiffness.

DESCRIPTION OF DRAWINGS

The above and other objects, features and other advantages of the present invention will be more clearly understood from the following detailed description taken in conjunction with the accompanying drawings, in which.

BEST MODE

Figure 1:
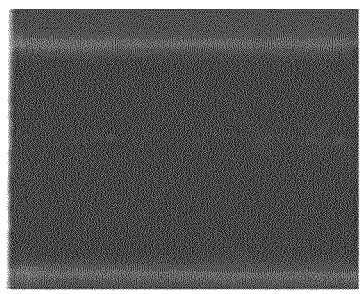
FIG. 1 shows a fold crack image, a fold crack SEM image (×90) and an adhesion force image of coated paper prepared in Example 1 of the present invention.
Figure 1:
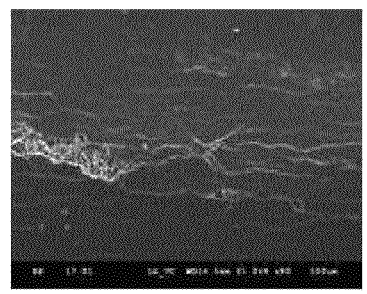
Figure 1:
Figure 2:
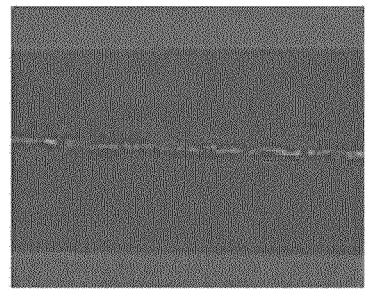
FIG. 2 shows a fold crack image, a fold crack SEM image (×90) and an adhesion force image of coated paper prepared in Comparative Example 1.
Figure 2:
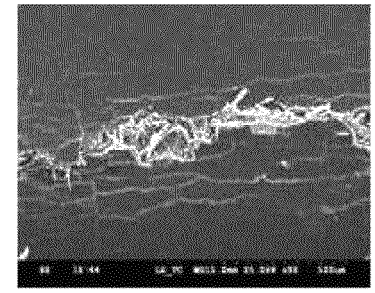
Figure 2:

Now, the present invention will be described in more detail with reference to the following examples. These examples are only provided to illustrate the present invention and should not be construed as limiting the scope and spirit of the present invention.

PREPARATION EXAMPLE

Preparation of Latex

As listed in Table 1 below, six types of latexes having different glass transition temperatures and different particle sizes were polymerized in a 10 L autoclave using an emulsion polymerization method. To adjust the glass transition temperature, a ratio of styrene to butadiene was controlled, and in order to control particle size, an amount of emulsifier was controlled. During polymerization, amounts of other monomers and additives were kept the same, except amounts of styrene, butadiene and emulsifier. The polymerization temperature was maintained at 72° C.

The glass transition temperature (° C.) of the prepared latex was measured using a differential scanning calorimeter (DSC) and particle size (nm) thereof was measured by a laser scattering method.

TABLE 1

| Items | Latex A | Latex B | Latex C | Latex D | Latex E | Latex F |
|---|---|---|---|---|---|---|
| Styrene (parts by weight) | 65 | 69 | 49 | 44 | 65 | 49 |
| Butadiene (parts by weight) | 31 | 27 | 47 | 52 | 31 | 47 |
| Dodecyldibenzene sodium sulfonate (parts by weight) | 5.5 | 4.5 | 3 | 4 | 3 | 5.5 |
| Acrylic acid (parts by weight) | | | | 4 | | |
| t-dodecylmercaptan (parts by weight) | | | | 0.25 | | |
| Potassium sulfate (parts by weight) | | | | 0.9 | | |
| Glass transition temperature (° C.) | 17 | 25 | −14 | −22 | 17 | −14 |
| Particle size (nm) | 90 | 110 | 155 | 130 | 155 | 90 |

(Preparation and Coating of Coating Solution):

100 parts by weight of calcium carbonate was used as a pigment for the first coating solution (pre-coating), 4 parts by weight of starch was used as a thickener, and latex content was controlled as shown in below Tables 2 and 3. The coating solution prepared had a solid content of 65% and pH of 9.

For the second coating solution (top coating), 80 parts by weight of calcium carbonate and 20 parts by weight of clay were used, and 0.3 part by weight of CMC (Finfix 5) was used as a thickener. A latex content was controlled as shown in below Tables 2 and 3. The coating solution prepared had a solid content of 68% and pH of 9.

Also, the coating was carried out using a MLC lab coater, the base paper used herein was base paper for art paper having a basis weight of 160 g/m², and the two layers were controlled such that a total coating thickness was 40 μm and satisfied a layer ratio set forth in Table below.

The coating speed was 100 m/min, and drying condition was carried out in hot air at 130° C. and IR at 100° C. as constant portions of 5 seconds. The calendar used for this experiment was a super calendar (manufacturer: SMT) and the super calendar was performed 100 kg/cm and 4 m/min, 2 times pass at 60° C.

(Measurement Method of Physical Properties).

Physical properties of coated papers manufactured in the examples and comparative examples were measured by the following manner and summarized in the following table.

1) Fold Crack:

0.6 cc of a commercial magenta ink was printed on coated paper and then dried under 25° C. and RH 50% at constant temperature and humidity chamber for one day. After the drying, the printed coated paper was folded under the pressure of 12 kgf in a machine direction (MD) in a pressing machine to cause fold cracking. A crack level was measured by image-scanning a certain area which includes the fold part and then performing calculation by using the following equation using a photoshop program.

Increase in fold crack area represents severe fold cracking. In addition, a scanning electron micrograph (SEM) photographs of the coated paper was taken and observed with the naked eye.

Fold crack area (%)=number of white pixels/total pixel number×100  [Equation 1]

2) Paper stiffness: was measured by bending in a machine direction (MD) using a bending resistance tester (Gurley). The higher the value, the paper has excellent stiffness.

3) Adhesion force: was measured by printing several times using an RI presses and then evaluating a detachment level by a five-point method to the naked eye. As the score increases, adhesion force is superior. The higher the scores, the paper has good adhesion force, and were measured using the Tag Value 12, 14, 16 inks and an average thereof was calculated. In addition, a scanning electron micrograph pictures of the coated paper was taken and observed with the naked eye.

4) Paper Gloss:

Paper gloss of the various parts of coated paper was measured by an optical gloss meter (HUNTER type, 75°) and an average thereof was calculated.

Examples 1 to 7

Types of latexes, a thickness ratio of each of first and second coating layers with respect to the total coating layer thickness of and content etc used for experiments in accordance with polymerization and coating methods described above as examples of the present invention are summarized in the following Table 2 and the measured physical properties are summarized in the following Table 4.

TABLE 2

| Ex. No. | Combination of first latex and second latex | Thickness ratio of first and second coating layers | First latex content (% by weight) | Second latex content (% by weight) |
|---|---|---|---|---|
| 1 | A-C | 0.5 | 9 | 13 |
| 2 | A-C | 0.8 | 9 | 13 |
| 3 | A-C | 0.5 | 5 | 13 |
| 4 | A-C | 0.5 | 9 | 17 |
| 5 | A-D | 0.5 | 9 | 13 |
| 6 | B-C | 0.5 | 9 | 13 |
| 7 | B-D | 0.5 | 9 | 13 |

Comparative Examples 1 to 7

Types of latexes, a thickness ratio and content etc used for experiments in accordance with polymerization and coating methods described above as comparative examples of the present invention are summarized in the following Table 3 and the measured physical properties are summarized in the following Table 4. In Comparative Example 7, a mixture of latexes A and C was applied to a single coating layer having the same thickness.

TABLE 3

| Comp. Ex. No. | Combination of first latex and second latex | Thickness ratio of first and second coating layers | First latex content (% by weight) | Second latex content (% by weight) |
|---|---|---|---|---|
| 1 | A-C | 1.5 | 9 | 13 |
| 2 | C-A | 0.5 | 9 | 13 |
| 3 | C-A | 1.5 | 5 | 13 |
| 4 | E-F | 0.5 | 9 | 17 |
| 5 | A-A | 0.5 | 9 | 13 |
| 6 | C-C | 0.5 | 9 | 13 |
| 7 | A + C mixture | — | 9 | 13 |

TABLE 4

| Items | Fold crack area (%) | Paper stiffness (g) | Adhesion force (5-score method) | Paper gloss (%) |
|---|---|---|---|---|
| Ex. 1 | 12.7 | 78.5 | 4.5 | 71.8 |
| Ex. 2 | 20.5 | 81.2 | 4.3 | 72.4 |
| Ex. 3 | 19.6 | 82.8 | 4.0 | 72.2 |
| Ex. 4 | 9.3 | 74.0 | 4.7 | 69.5 |
| Ex. 5 | 9.5 | 70.2 | 4.7 | 68.7 |
| Ex. 6 | 22.1 | 74.1 | 4.2 | 71.4 |
| Ex. 7 | 17.1 | 78.2 | 4.5 | 68.9 |
| Comp. Ex. 1 | 38.5 | 85.9 | 3.5 | 72.2 |
| Comp. Ex. 2 | 51.1 | 86.5 | 3.5 | 73.7 |
| Comp. Ex. 3 | 43.0 | 62.8 | 4.5 | 73.7 |
| Comp. Ex. 4 | 35.4 | 60.0 | 4.6 | 68.8 |
| Comp. Ex. 5 | 72.6 | 88.2 | 3.0 | 74.0 |
| Comp. Ex. 6 | 24.0 | 54.4 | 4.8 | 68.2 |
| Comp. Ex. 7 | 49.5 | 80.3 | 4.0 | 72.7 |

As apparent from the above results, Examples 1 to 7 according to the present invention exhibited excellent resistance to fold crack while maintaining the stiffness.

Meanwhile, Comparative Example 1 in which a thickness ratio of the first and second coating layers exceeded 1 and Comparative Example 2 in which latexes were applied opposite to Example 1 were poor in terms of fold crack area and adhesion force, and Comparative Example 3 reflecting Comparative Examples 1 and 2, and Comparative Example 4 in which types of latexes were unsuitable were poor in terms of both fold crack area and paper stiffness.

In addition, Comparative Example 5 or 6 in which all two layers were formed of the same latex were poor in terms of either fold crack area or paper stiffness. Also, Comparative Example 7 in which a single coating layer was formed using a mixture of two types of styrene-butadiene latexes having different glass transition temperatures and different particle sizes as a single coating layer exhibited poor fold crack properties.

Accordingly, the present invention provides an optimum paper coating solution by controlling a composition of binder in the paper coating solution and the thickness ratio of a coating layer formed therefrom.

INDUSTRIAL APPLICABILITY

The present invention provides coated paper with reduced fold crack and improved paper stiffness.

The invention claimed is:

1. Coated paper coated with a paper coating solution comprising a pigment, an auxiliary pigment and a styrene-butadiene latex,
    wherein the coated paper has a double-layer coating structure in which a pre-coating layer and a top coating layer comprising styrene-butadiene latexes having different particle sizes and different glass transition temperatures are sequentially formed on a base paper,
    wherein the double-layer coating structure includes a first coating layer as the pre-coating layer and a second coating layer as the top coating layer,
    wherein a thickness ratio of the first coating layer to the second coating layer is 0.1 to 1.0 and a total thickness of the first coating layer and the second coating layer is 20 to 60 μm,
    wherein the first coating layer is formed using a coating solution comprising a latex having a particle size of 70 to 120 nm and a glass transition temperature of 10 to 30° C., and
    wherein the second coating layer is formed using a coating solution comprising a latex having a particle size of 120 to 200 nm and a glass transition temperature of −30 to 0° C.

2. The coated paper according to claim 1, wherein the coating solution is prepared by mixing 5 to 20 parts by weight of a styrene-butadiene latex with 0.1 to 9 parts by weight of a thickener, based on 100 parts by weight of the pigment and the auxiliary pigment.

3. The coated paper according to claim 1, wherein a content of the latex in the first coating layer is 3 to 15% by weight, based on the total solid content of the first coating layer.

4. The coated paper according to claim 1, wherein a content of the latex in the second coating layer is 7 to 20% by weight, based on the total solid content of the second coating layer.

5. The coated paper according to claim 1, wherein the pigment is clay, calcium carbonate or a mixture thereof.

6. The coated paper according to claim 1, wherein the auxiliary pigment is a plastic pigment, titanium oxide or a mixture thereof.

7. The coated paper according to claim 1, wherein the styrene-butadiene latex of the pre-coat layer and the top coat layer comprises 29 to 79 parts by weight of a styrene monomer, 20 to 70 parts by weight of a butadiene monomer, and 1 to 10 parts by weight of an ethylenically unsaturated acid monomer.

8. The coated paper according to claim 7, wherein the styrene-butadiene latex further comprises at least one selected from the group consisting of 20 parts or less by weight based on the total weight of the monomers of an ethylenically unsaturated nitrile monomer and 8 parts or less by weight based on the total weight of the monomers of an ethylenically unsaturated monomer.

* * * * *